United States Patent
Takemasa

(10) Patent No.: US 12,219,295 B2
(45) Date of Patent: Feb. 4, 2025

(54) DISPLAY DEVICE

(71) Applicant: Japan Display Inc., Tokyo (JP)

(72) Inventor: Kenichi Takemasa, Tokyo (JP)

(73) Assignee: Japan Display Inc., Tokyo (JP)

(*) Notice: Subject to any disclaimer, the term of this patent is extended or adjusted under 35 U.S.C. 154(b) by 66 days.

(21) Appl. No.: 18/097,528

(22) Filed: Jan. 17, 2023

(65) Prior Publication Data

US 2023/0239441 A1 Jul. 27, 2023

(30) Foreign Application Priority Data

Jan. 21, 2022 (JP) ................. 2022-008162

(51) Int. Cl.
- *H04N 9/31* (2006.01)
- *G02B 5/08* (2006.01)
- *G03B 21/62* (2014.01)

(52) U.S. Cl.
CPC ............ *H04N 9/3141* (2013.01); *G02B 5/08* (2013.01); *G02B 2207/101* (2013.01); *G03B 21/62* (2013.01)

(58) Field of Classification Search
CPC ...... H04N 9/3141; H04N 7/147; H04N 7/142; G02B 5/08; G02B 2207/101; G02B 30/60; G03B 21/62; G03B 21/28
See application file for complete search history.

(56) References Cited

U.S. PATENT DOCUMENTS

2020/0372902 A1   11/2020   Takami
2024/0077996 A1*   3/2024   Kong ................. G06F 1/1605

FOREIGN PATENT DOCUMENTS

| JP | 2013-041100 A | 2/2013 |
| WO | 2019138592 A1 | 7/2019 |
| WO | 2019/150996 A1 | 8/2019 |

* cited by examiner

*Primary Examiner* — Michael E Teitelbaum
(74) *Attorney, Agent, or Firm* — Michael Best & Friedrich LLP

(57) ABSTRACT

Used is a display device having: a support; first and second image light source units mounted on the support; a first half mirror mounted on the support and having a first reflecting surface inclined with respect to an emitting direction of light of the first image light source unit; and a second half mirror mounted on the support and having a second reflecting surface inclined with respect to an emitting direction of light of the second image light source unit. The light emitted from the first image light source unit is reflected by the first reflecting surface and irradiated in a first direction, and the light emitted from the second image light source unit is reflected by the second reflecting surface and irradiated in a second direction different from the first direction. The same image or a different image can be simultaneously displayed at the first and second display regions.

3 Claims, 3 Drawing Sheets

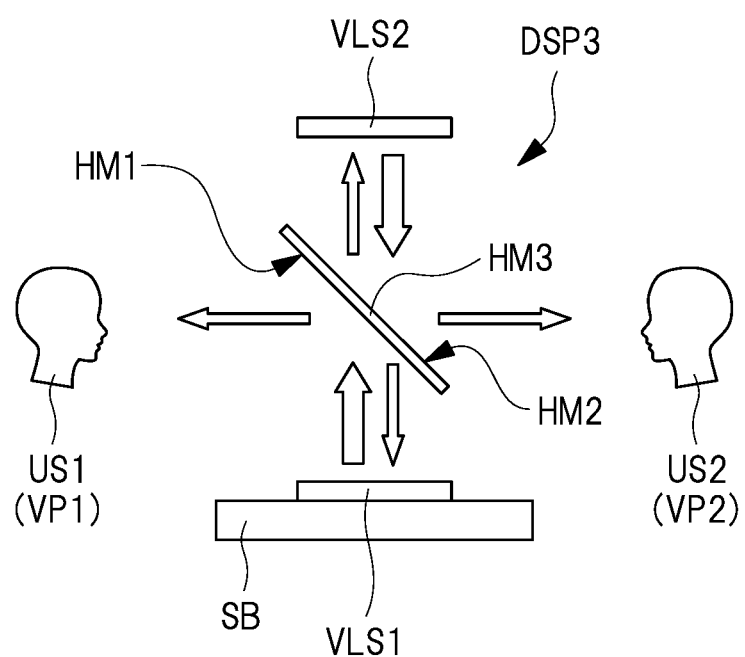

DISPLAY DEVICE

CROSS-REFERENCE TO RELATED APPLICATION

The present application claims priority from Japanese Patent Application No. 2022-8162 filed on Jan. 21, 2022, the content of which is hereby incorporated by reference into this application.

TECHNICAL FIELD OF THE INVENTION

The present invention relates to a display device.

BACKGROUND OF THE INVENTION

In recent years, developed has been a display device that arranges a transparent display between a plurality of users, displays an image on the transparent display, and presents the image to each of the two users. As such a display advice, Patent Document 1 (Japanese Patent Application Laid-Open No. 2013-41100) discloses a display device that is arranged between a plurality of users and overlaps two of front-side and back-side organic EL (Electro-Luminescence) panels. Patent Document 2 (International Publication No. 2019/150996) discloses placing a transparent screen between a plurality of users and projecting a language image onto the transparent screen from a projector. Further, Patent Document 3 (International Publication No. 2019/138592) discloses that users in remote locations mutually use an image communication device to cause the respective users to visually recognize a common image, the image communication device projecting images onto a half mirror arranged above a display surface of a display unit.

SUMMARY OF THE INVENTION

For example, as in Patent Documents 1 and 2, when the transparent display is arranged between the two users facing each other, an image is displayed on this transparent display, and the image is presented to each of the two users, it is conceivable that since the display is transparent, the image presented to one of the users may be visually recognized in a reversed state by the other of the users. This impairs appearance of the displayed image and causes deterioration in visual quality during face-to-face communication, thereby reducing visibility of the displayed image. Moreover, problems arise when one user desires to present different images to respective users at the same time, when the one user desires to display a large image in a limited display region, and the like. For example, if light to a back side is blocked, the reversed image can be prevented from being visually recognized by the other user, but transmittance of the display device is lowered. In addition, a plurality of devices disclosed in Patent Document 3 need to be prepared according to the number of users, and are not suitable to arrange and use them between the users facing each other.

Further, since the display disclosed in Patent Document 1 is made by stacking a plurality of organic ELs, the light's transmittance is low and the visibility of the other user on the other side of the display is low. In addition, in a technique disclosed in Patent Document 2, since a language image is projected onto a transparent screen by a projector, it is difficult to adjust a position of the projector so as not to dazzle the user. Further, since a space required for placing the endure device becomes large, a problem arises about the device being unable to be used easily.

Other problems and novel features will be apparent from the description of the present specification and the accompanying drawings.

A brief outline of representative one among embodiments disclosed in the present application will be described as follows.

A display device according to one embodiment includes: a support; a first light source and a second light source mounted on the support; a first half mirror mounted on the support and provided with a first reflecting surface inclined with respect to an emitting direction of light of the first light source; and a second half mirror mounted on the support and provided with a second reflecting surface inclined with respect to an emitting direction of light of the second light source, the first reflecting surface forms a first display region for projecting a first image projected from the first light source, the second reflecting surface forms a second display region for projecting a second image projected from the second light source, the light emitted from the first light source is reflected by the first reflecting surface and irradiated in a first direction, the light emitted from the second light source is reflected by the second reflecting surface and irradiated in a second direction different from the first direction, and a same image or different images can be displayed simultaneously in the first display region and the second display region.

BRIEF DESCRIPTION OF THE DRAWINGS

FIG. 5 is an explanatory drawing showing a configuration example of a display device that is a third embodiment.

DESCRIPTION OF THE PREFERRED EMBODIMENTS

Figure 1:
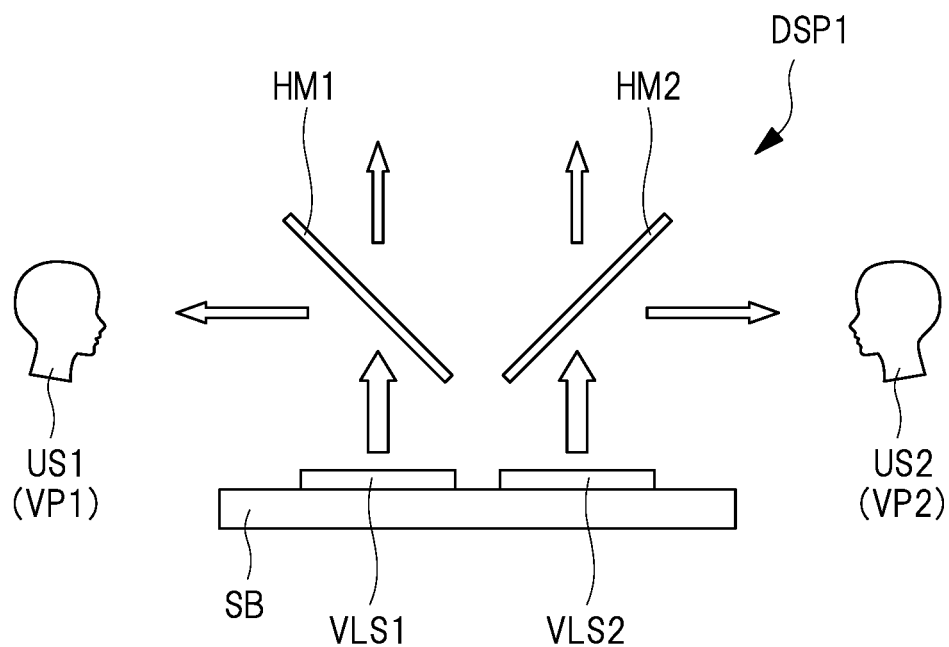
FIG. 1 is an explanatory drawing showing a configuration example of a display device that is a first embodiment.

Each embodiment of the present invention will be described below with reference to the drawings. Incidentally, the disclosure is merely an example, and an invention (s) that can be easily arrived at from appropriate modifications made by those skilled in the art while maintaining the gist of the present invention will be naturally included within the scope of the present invention. In addition, in order to make the description clearer, the drawings may schematically show the width, thickness, and shape, etc. of each part as compared to the actual embodiment, but this is only an example and the interpretation of the present invention is not intended to be limited. Further, in this specification and each figure, the same or related reference numerals may be given to elements similar to those described above with respect to the previous figures, and a detailed description thereof may be omitted as appropriate.

A display device described in the following embodiments arranges a transparent display between a plurality of (for example, two) users facing each other, displays an image on the transparent display, and presents the image to each user. Here, by using a light source mounted on a support and a half mirror inclined with respect to the light source, it will be described that different images are presented to each user without being reversed. Incidentally, lenses, polarizing plates, and the like will be omitted in the drawings used in the following description.

First Embodiment

Structure of Display Device

Hereinafter, a structure of a display device according to the present embodiment will be described with reference to FIGS. 1 to 3. Each of FIGS. 1 to 3 is an explanatory drawing showing a configuration example of a display device that is the present embodiment.

As shown in FIG. 1, a display device DSP1 of the present embodiment is arranged and used between a user US1 at a first viewing position VP1 and a user US2 at a second viewing position VP2, who face each other. The display device DSP1 has a support SB, image light source units VLS1, VLS2 mounted on the support SB, and half mirrors HM1, HM2 mounted on the support SB. Each of the image light source units VLS1, VLS2 has a display surface for displaying an image, and emits light in a direction perpendicular to the display surface (vertical direction). A shape of the support SB is, for example, plate-like. The image light source units VLS1, VLS2 are different light sources separated from each other. Therefore, the display surface of the image light source unit VLS1 and the display surface of the image light source unit VLS2 are separated from each other. The adjacent image light source unit VLS1 and image light source unit VLS2 emit light in the same direction.

Figure 2:
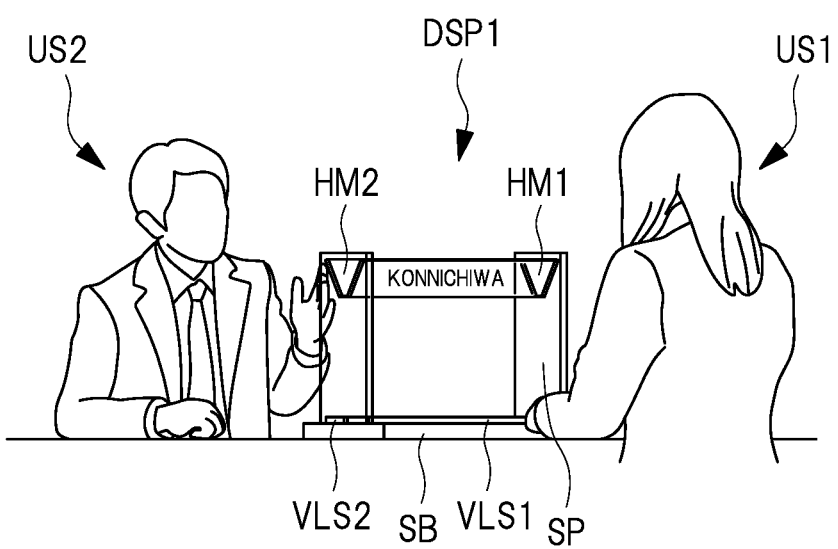
FIG. 2 is an explanatory drawing showing a configuration example of the display device that is the first embodiment.
Figure 3:
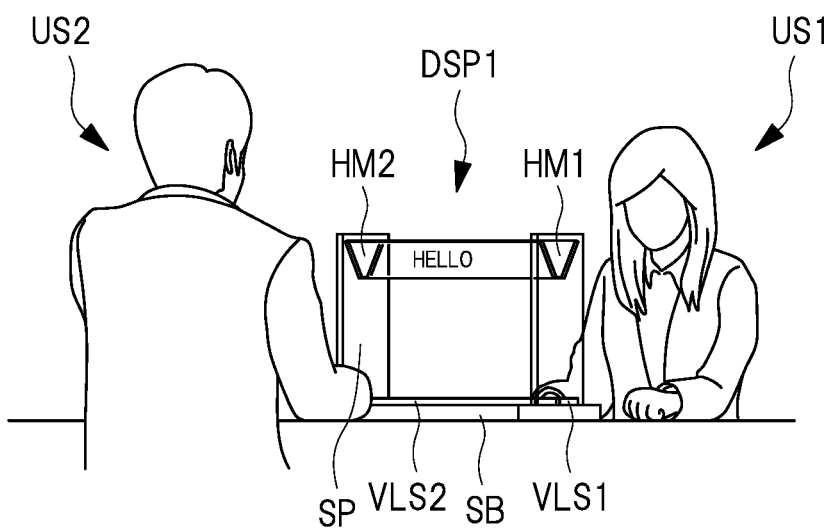
FIG. 3 is an explanatory drawing showing a configuration example of the display device that is the first embodiment.

As shown in FIGS. 2 and 3, a pair of column supports SP are fixed to the support SB, and each of the image light source units VLS1, VLS2 is fixed to an upper surface of the support SB. Both ends of each of the half mirrors HM1, HM2 are fixed to the column supports SP. That is, each of the half mirrors HM1, HM2 is fixed to (mounted on) the support SB via the column support SP.

As shown in FIG. 1, the half mirror HM1 is arranged in a vertical direction of the display surface of the image light source unit VLS1. Also, the half mirror HM1 has a reflecting surface inclined with respect to a direction in which light from the image light source unit VLS1 is emitted. Consequently, the light emitted from the display surface of the image light source unit VLS1 is reflected by the reflecting surface of the half mirror HM1, is irradiated in a first direction, and reaches the first viewing position VP1. In this way, the first image displayed on the display surface of the image light source unit VLS1 is projected onto the reflecting surface of the half mirror HM1 and presented as a normal image at the first viewing position VP1. The reflecting surface of the half mirror HM1 forms a first display region for projecting the first image projected from the image light source unit VLS1.

At this time, since the light emitted from the display surface of the image light source unit VLS1 is not reflected on a second viewing position VP2 side, the first image cannot be visually identified at the second viewing position VP2. In other words, the first image is not presented to the user US2. An inclination angle of the reflecting surface of the half mirror HM1 with respect to a direction in which light from the image light source unit VLS1 is emitted is, for example, 45 degrees.

Also, the half mirror HM2 is arranged in a vertical direction of the display surface of the image light source unit VLS2. Further, the half mirror HM2 has a reflecting surface inclined with respect to a direction in which light from the image light source unit VLS2 is emitted. Consequently, the light emitted from the display surface of the image light source unit VLS2 is reflected by the reflecting surface of the half mirror HM2, is irradiated in a second direction different from the first direction, and reaches the second viewing position VP2. In this way, the second image displayed on the display surface of the image light source unit VLS2 is projected onto the reflecting surface of the half mirror HM2 and presented as a normal image at the second viewing position VP2. The reflecting surface of the half mirror HM2 forms a second display region for projecting a second image projected from the image light source unit VLS2.

At this time, since the light emitted from the display surface of the image light source unit VLS2 is not reflected on a first viewing position VP1 side, the second image cannot be visually recognized at the first viewing position VP1. In other words, the second image is not presented to the user US1. The second direction is, for example, a direction opposite to the first direction. An inclination angle of the reflection surface of the half mirror HM2 with respect to a direction in which light from the image light source unit VLS2 is emitted is, for example, 45 degrees.

The half mirrors HM1, HM2 are transparent reflectors and have light transmittance. Consequently, the users US1, US2 can visually recognize mutual states via the display device DSP1. Each of the half mirrors HM1, HM2 has a reflecting surface and an opposite surface thereto. It is preferable that a thickness of each of the half mirrors HM1, HM2, that is, a thickness between the reflecting surface and the opposite surface thereof is extremely thin. Further, part of the light emitted from the image light source units VLS1, VLS2 is transmitted upward through the half mirrors HM1, HM2. Acrylic plates, for example, can be used for the half mirrors HM1, HM2. Although not shown in FIG. 1, arranged between the image light source unit VLS1 and the half mirror HM1 and between the image light source unit VLS2 and the half mirror HM2 may be polarizing plates, mirrors, lenses, or the like in the vicinity of the respective light sources.

The image light source units VLS1, VLS2 may be systems that display images independently from each other. When the users desire each other to display the same image in correct orientations, the image light source units VLS1, VLS2 may be synchronized to display the same image at the same time. That is, the first image and the second image may be the same image or different images, and may be displayed at the same time or at different timing.

FIGS. 2 and 3 show cases where different images are presented to the respective users US1, US2 at the same timing. As shown in FIG. 2, the user US1 can visually recognize the language image "KONNICHIWA" as the first image projected on the reflecting surface (first display region) of the half mirror HM1. In contrast, at the same timing, as shown in FIG. 3, the user US2 can visually recognize the language image "HELLO" as the second image projected on the reflecting surface (second display region) of the half mirror HM2.

Effect of Present Embodiment

When the transparent display is arranged between the plurality of users facing each other and the images are displayed on this transparent display to present the image to each user, it is conceivable that the image presented to one user will be visually recognized in a reversed sate by the other user since the display is transparent. This causes poor appearance during face-to-face communication. For example, if the light to a back side is blocked, the reversed image can be prevented from being visually recognized by the other user, but the transmittance of the display device is lowered.

In contrast, since the display device of the present embodiment projects an image onto a reflecting surface that is inclined with respect to an emitting direction of light from each image light source unit, the image presented at one viewing position is prevented from being visually recognized at the other viewing position. Consequently, the image presented at the one viewing position is not visually recognized in a horizontally reversed state from the other viewing position. Therefore, appearance in the face-to-face communication can be improved.

For example, as shown in FIGS. 2 and 3, the language uttered by the user US1 is projected onto the display region on the user US1 side, and a result of automatic translation of the language by the system can be projected on the display region on the user US2 side by another language. At that time, since the one user does not see the reversed image of the language uttered by the other user, the face-to-face communication can be performed smoothly without impairing the appearance of the displayed image.

Also, in educational situations, amusement machines which the users play face-to-face, or the like, there may be situations where an image that the one user desires to display only to himself or herself without being displayed to the other user is displayed on the transparent display. In such a case, by using the display device of the present embodiment, the transparent display makes it possible to display the image, which the one user does not desire to transmit to the other user, only on the one user side by using the transparent display while checking a state of the other user side by using the transparent display.

Further, the display device of the present embodiment does not display an image on a transparent display such as an organic EL display, but presents an image by causing light to be reflected on a half mirror that is a transparent plate, so that the display region of the display device has high transmittance. Therefore, the users facing each other can clearly visually recognize each other, and smooth face-to-face communication can be realized.

Also, the display device of the present embodiment can be used simply by arranging one device having a reflector between the mutually facing users. For example, when an image is projected onto a transparent screen by using a projector, it is difficult to adjust a position of the projector so as not to dazzle the user. However, in the display device of the present embodiment, an installation location of the image light source unit has already been adjusted, so that the display device of the present embodiment can be used easily. Also, since such a projector is not used, a space required for arranging the entire device has can be made small.

Second Embodiment

Figure 4:
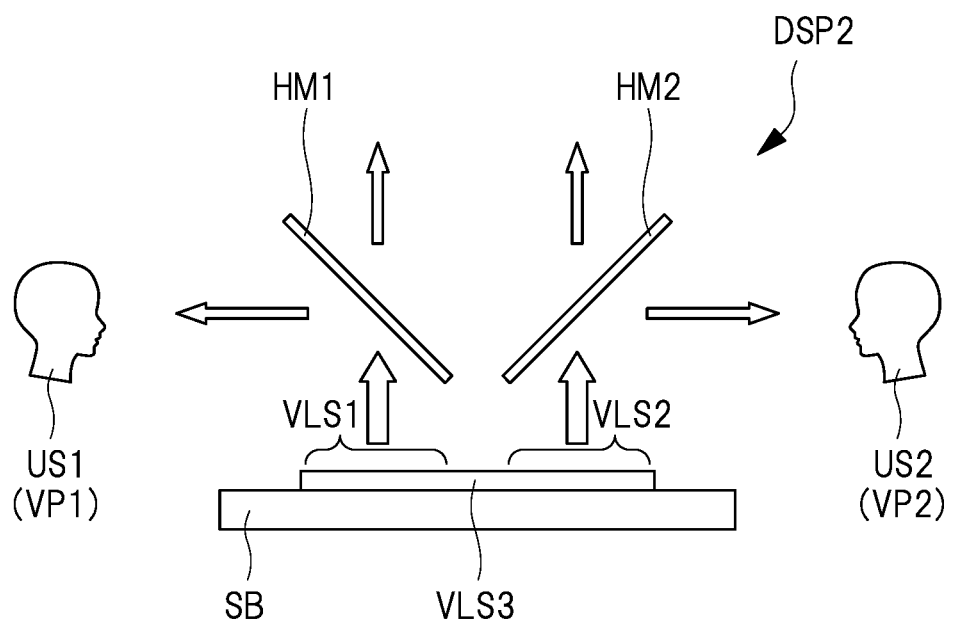
FIG. 4 is an explanatory drawing showing a configuration example of a display device that is a second embodiment.

In the above-mentioned first embodiment, a case where the image light source units VLS1, VLS2 are mutually separate light sources has been described. In contrast, as described below with reference to FIG. 4, one image light source unit is used, and two regions of a display surface of the image light source unit may be used as a first light source unit and a second light source unit, respectively. FIG. 4 is an explanatory diagram showing a configuration example of a display device DSP2 that is the present embodiment.

As shown in FIG. 4, an image light source unit VLS3 is mounted on an upper surface of a support SB. The image light source unit VLS3 has one display surface for displaying an image. The image light source unit VLS3 has two portions adjacent to each other in a direction along the display surface, one of the portions forming an image light source unit VLS1 and the other forming an image light source unit VLS2. That is, the image light source unit VLS3 includes the adjacent image light source unit VLS1 and image light source unit VLS2. A display surface of the image light source unit VLS1 forms part of a display surface of the image light source unit VLS3, and the display surface of the image light source unit VLS2 forms part of a display surface of the image light source unit VLS3. The adjacent image light source unit VLS1 and image light source unit VLS2 emit light in the same direction. That is, in the present embodiment, one display region of the image light source unit VLS3 is divided into two, and light of the image displayed in each display region is caused to be made incident on the separate reflectors. Other configurations of the display device DSP2 of the present embodiment are the same as those of the display device DSP1 described with reference to FIGS. 1 to 3.

In the present embodiment, the first image is displayed at a portion of the display surface of the image light source unit VLS3 on the image light source unit VLS1 side, and the second image is displayed at a portion of the display surface of the image light source unit VLS3 on the image light source unit VLS2 side. With such a configuration, even if the number of light sources is one, the same effect as that in the first embodiment can be obtained by dividing the display region of the image.

Third Embodiment

In the first embodiment, a case where the image light source units VLS1, VLS2 are adjacent to each other in the direction along the display surface has been described. In contrast, as described below with reference to FIG. 5, the image light source units VLS1, VLS2 may be arranged so that their display surfaces face each other. FIG. 5 is an explanatory diagram showing a configuration example of a display device DSP3 that is the present embodiment.

As shown in FIG. 5, an image light source unit VLS1 is mounted on an upper surface of a support SB with a display surface thereof facing upward. In addition, an image light source unit VLS2 is mounted on the support SB directly above the image light source unit VLS1 with a display surface thereof facing downward. That is, the display surface of the image light source unit VLS1 and the display surface of the image light source unit VLS2 are separated from each other. One half mirror HM3 is arranged between the image light source unit VLS1 and the image light source unit VLS2, and the half mirror HM3 constitutes half mirrors HM1, HM2. That is, the half mirror HM3 has reflecting surfaces on both sides. In other words, the half mirror HM3 has the reflecting surface of the half mirror HM1, and has the reflecting surface of the half mirror HM2 on its opposite side.

The half mirror HM3 and the image light source unit VLS2 are fixed to, for example, a column support SP shown in FIG. 2. Each of the half mirrors HM1, HM2 has a reflecting surface inclined with respect to a direction in which light from the image light source units VLS1, VLS2 is emitted.

With such a structure, the light emitted from the display surface of the image light source unit VLS1 is reflected by the reflecting surface of the half mirror HM1, is irradiated toward a first direction, and reaches the first viewing position VP1. At this time, since the light emitted from the display surface of the image light source unit VLS1 is not reflected on a second viewing position VP2 side, the first image cannot be visually recognized at the second viewing position VP2. Also, the light emitted from the display surface of the image light source unit VLS2 is reflected by the reflecting surface of the half mirror HM2, is irradiated toward a second direction different from the first direction, and reaches the second viewing position VP2. At this time, since the light emitted from the display surface of the image light source unit VLS2 is not reflected on the first viewing position VP1 side, the second image cannot be visually recognized at the first viewing position VP1.

Therefore, even when the respective display surfaces of the image light source units VLS1, VLS2 are arranged to face each other as in the present embodiment, the same effect as that in the first embodiment can be obtained.

Also, here, the image light source units VLS1, VLS2 are not arranged side by side but are arranged alongside in a vertical direction and overlapped. Further, here, the half mirrors HM1, HM2 are not arranged side by side, and one half mirror HM3 is arranged between the image light source units VLS1 and VLS2. Therefore, as compared to the first and second embodiments, a width of the display device DSP3 between the users US1 and US2 can be reduced to about half.

Although the embodiments and representative modification explains have been described above, the above technology can be applied to various modification examples other than the illustrated modification examples. Incidentally, the "image" referred to in the present application may be replaced with a "video" that is a moving image.

Within the scope of the idea of the present invention, those skilled in the art can arrive at various modification examples and alteration examples, and it is understood that these modification examples and alteration examples also fall within the scope of the present invention. For example, additions, deletions, or design changes of components, or additions, omissions, or condition changes of steps appropriately made to the above-described embodiments by those skilled in the art are also included in the scope of the present invention as long as having the gist of the present invention.

INDUSTRIAL APPLICABILITY

The present invention can be used for display devices.

What is claimed is:
1. A display device comprising:
a support;
a first light source and a second light source mounted on the support;
a first half mirror mounted on the support and provided with a first reflecting surface inclined with respect to an emitting direction of light of the first light source; and
a second half mirror mounted on the support and provided with a second reflecting surface inclined with respect to an emitting direction of light of the second light source,
wherein the first reflecting surface forms a first display region for projecting a first image projected from the first light source,
the second reflecting surface forms a second display region for projecting a second image projected from the second light source,
the light emitted from the first light source is reflected by the first reflecting surface and irradiated in a first direction,
the light emitted from the second light source is reflected by the second reflecting surface and irradiated in a second direction different from the first direction,
a same image or different images can be displayed simultaneously in the first display region and the second display region,
the first light source and the second light source are included in a third light source,
a first display surface of the first light source forms part of a third display surface of the third light source,
a second display surface of the second light source forms another part of the third display surface of the third light source, and
the first light source and the second light source irradiate the light in a same direction.

2. A display device, comprising:
a support;
a first light source and a second light source mounted on the support;
a first half mirror mounted on the support and provided with a first reflecting surface inclined with respect to an emitting direction of light of the first light source; and
a second half mirror mounted on the support and provided with a second reflecting surface inclined with respect to an emitting direction of light of the second light source,
wherein the first reflecting surface forms a first display region for projecting a first image projected from the first light source,
the second reflecting surface forms a second display region for projecting a second image projected from the second light source,
the light emitted from the first light source is reflected by the first reflecting surface and irradiated in a first direction,
the light emitted from the second light source is reflected by the second reflecting surface and irradiated in a second direction different from the first direction,
a same image or different images can be displayed simultaneously in the first display region and the second display region,
a first display surface of the first light source and a second display surface of the second light source are separated from each other, and
the first display surface and the second display surface face each other so as to sandwich the first reflecting surface and the second reflecting surface, and irradiate light in directions facing each other.

3. A display device comprising:
a support;
a first light source and a second light source mounted on the support;
a first half mirror mounted on the support and provided with a first reflecting surface inclined with respect to an emitting direction of light of the first light source; and
a second half mirror mounted on the support and provided with a second reflecting surface inclined with respect to an emitting direction of light of the second light source,
wherein the first reflecting surface forms a first display region for projecting a first image projected from the first light source,
the second reflecting surface forms a second display region for projecting a second image projected from the second light source,
the light emitted from the first light source is reflected by the first reflecting surface and irradiated in a first direction, the light emitted from the second light source is reflected by the second reflecting surface and irradiated in a second direction different from the first direction, a same image or different images can be displayed simultaneously in the first display region and the second display region, wherein the first image reflected by the first reflecting surface is not presented at the second viewing position, and the second image reflected by the second reflecting surface is not presented at the first viewing position.

* * * * *